(No Model.) 3 Sheets—Sheet 2.
B. G. P. MÖLLER.
PHOTOGRAPHIC CAMERA.
No. 500,023. Patented June 20, 1893.
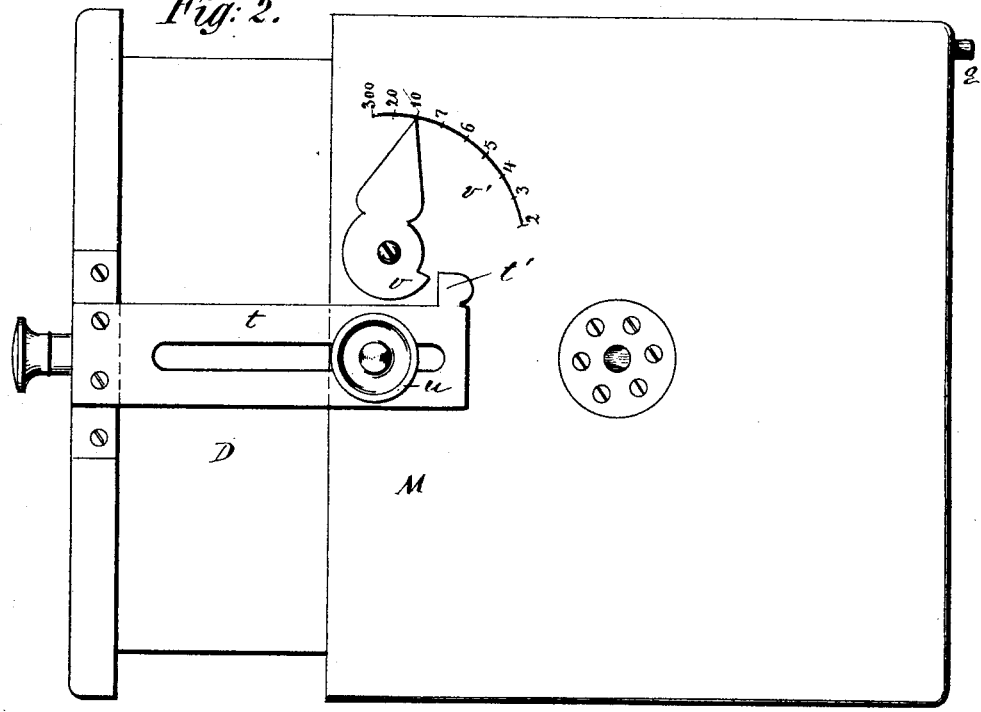
Fig: 2.
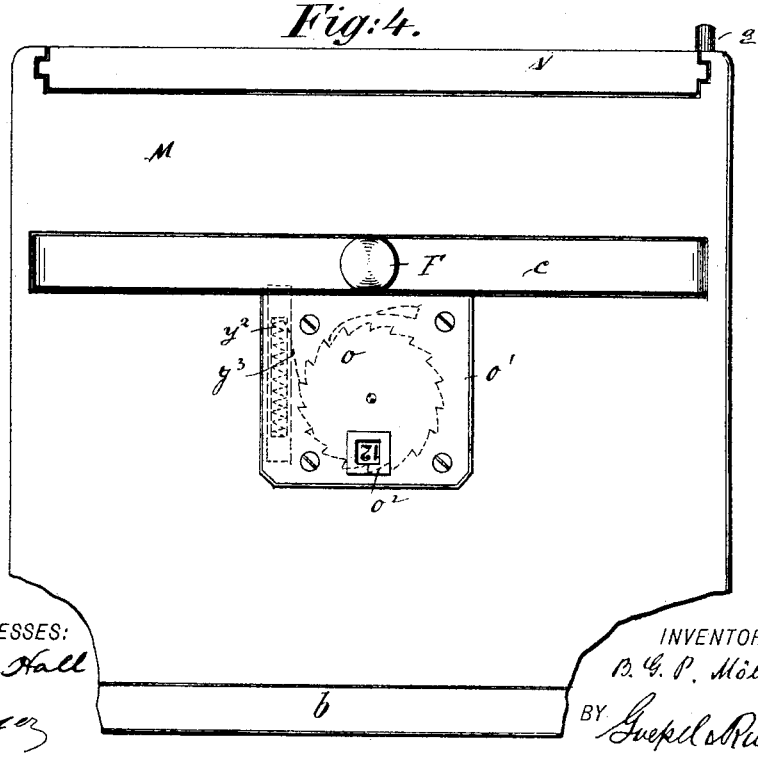
Fig: 4.
WITNESSES:
Marion Hall
H. Obermayer
INVENTOR
B. G. P. Möller
BY Goepel & Rueyener
ATTORNEYS.

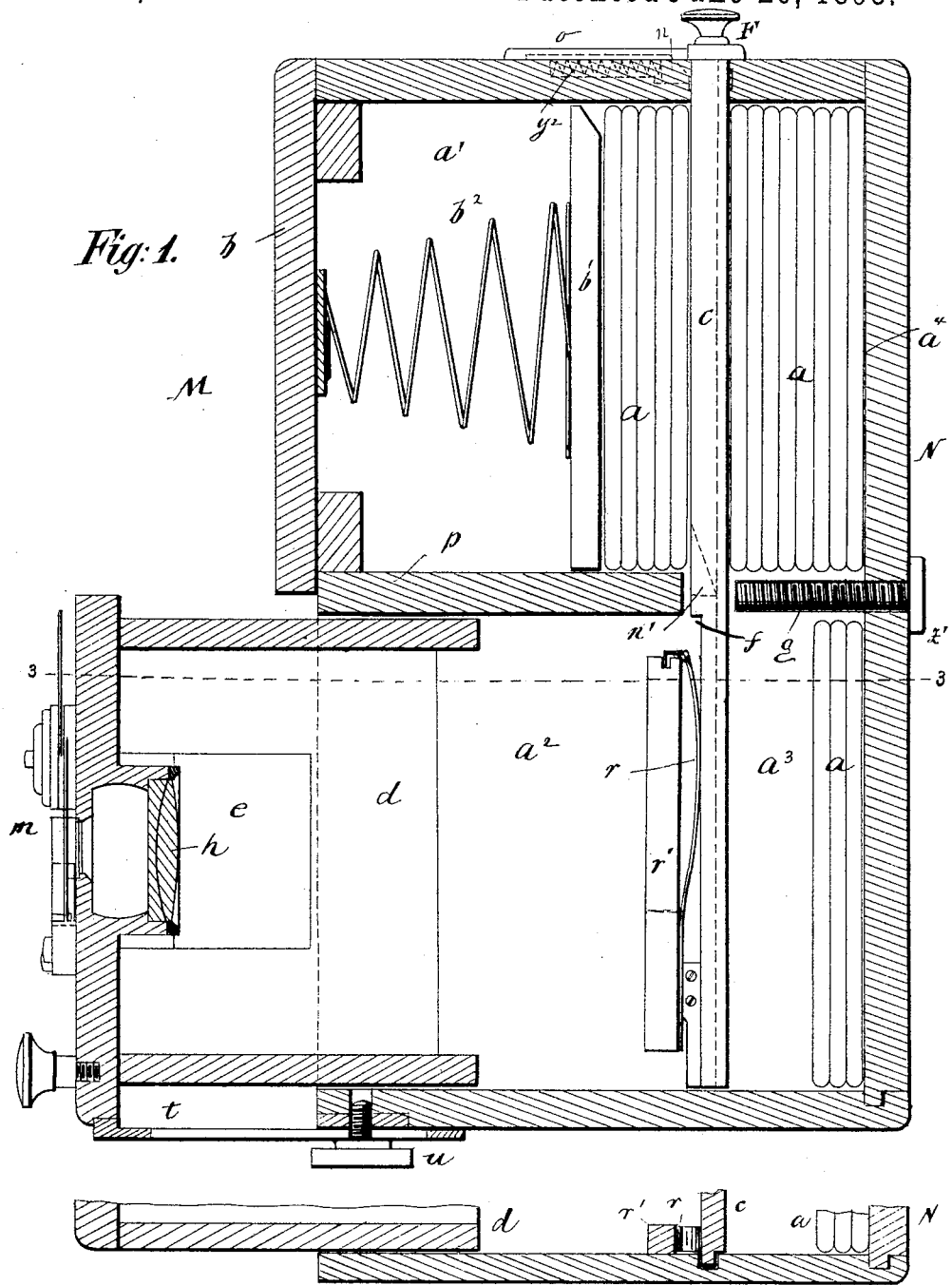

(No Model.) 3 Sheets—Sheet 3.

B. G. P. MÖLLER.
PHOTOGRAPHIC CAMERA.

No. 500,023. Patented June 20, 1893.

UNITED STATES PATENT OFFICE.

BERTEL GEORG PAGH MÖLLER, OF KOLDING, DENMARK.

PHOTOGRAPHIC CAMERA.

SPECIFICATION forming part of Letters Patent No. 500,023, dated June 20, 1893.

Application filed June 22, 1891. Serial No. 397,130. (No model.)

*To all whom it may concern:*

Be it known that I, BERTEL GEORG PAGH MÖLLER, a citizen of Denmark, residing at Kolding, Denmark, have invented certain new and useful Improvements in Photographic Apparatus, of which the following is a specification.

This invention relates to certain improvements in photographic cameras, and the object of my invention is to provide a new and improved photographic camera, which is so constructed that a great number of plates can be exposed very rapidly and can remain in the camera any length of time until they are developed.

Figure 5:
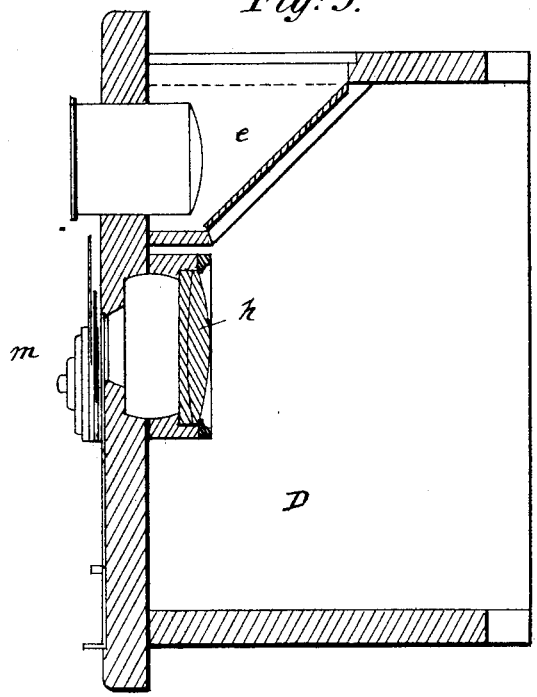
Figure 6:
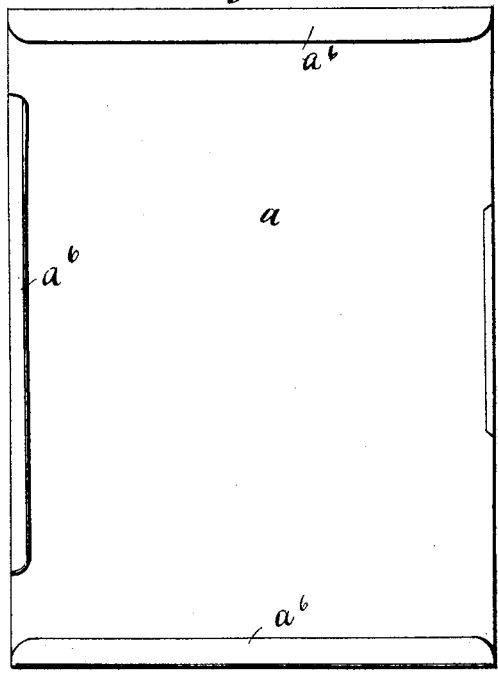

In the accompanying drawings, Figure 1 is a vertical, central longitudinal sectional view of my improved camera, the extension-piece being drawn out. Fig. 2 is a bottom-view of the same. Fig. 3 is a sectional plan-view on the line 3, 3, Fig. 1, the slide being removed. Fig. 4 is a plan-view of the camera. Fig. 5 is a horizontal sectional view of the slide or extension-piece, and Fig. 6 is a face-view of the plate-receiver.

Similar letters of reference indicate corresponding parts.

The camera consists of a box M divided by the horizontal transverse partition $p$ into the lower compartment $a^2$ and the upper plate compartment $a'$, said partition extending from the front wall of the camera to within a short distance from the rear wall. The front end of the lower compartment $a^2$ is open and contains the sliding-section $d$, in which the lens $h$, finder $e$, and shutter $m$ are arranged in the usual manner, said lens, finder and shutter being no part of my present invention. The plates are each placed into a receiver $a$ having flanges $a^6$ on the edges for holding the edges of the plate. After removing the front plate $b$ from the upper compartment $a'$ a number of plate-receivers are placed into said upper compartment $a'$ the follower $b'$ being placed against the front plate-receiver, said follower being connected by a helical spring $b^2$ with the front $b$ of the upper compartment $a'$. When the front $b$ is secured in place, the spring $b^2$ presses the follower against the front plate-receiver $a$. A slide $c$ passes through slots in the top of the camera and in the partition $p$ and is provided at its upper end with a handle or button F. Said slide is provided at the center with a beveled notch $n'$ which is adapted to act on the end of the sliding tooth $n$ arranged on the top of the casing and acted upon by a spring $y^2$ which presses the same toward the slide $c$. Said tooth is provided with a pawl-spring $y^3$ that acts on the ratchet-wheel $o$ of a counting-device $o'$ on the top of the camera, which counting-device has an aperture $o^2$, through which the numbers on the wheel show, there being as many numbers as there are teeth. Every time the slide $c$ is raised, which is necessary to shift the plates, as will be set forth hereinafter, the tooth $n$ snaps into the notch $n'$ in said slide and when the slide is pushed down the wheel $o$ of the counting device is rotated the distance of one tooth and a new number shows in an opening $o^2$. The counting-device thus shows the number of times that the slide $c$ has been raised for the purpose of setting or changing the plates. Said slide $c$ is arranged at its lower left hand side with a recess equal to the thickness of the plate-receiver, which recess forms a shoulder $f$. Springs $r$, Fig. 3, are secured to side-cleats $r'$ in the rear part of the compartment $a^2$ and serve to press the plate-receivers against the lower part of the slide $c$. When the slide $c$ is pulled upward, the spring $b^2$ presses the plate-receiver resting against the slide into the recess formed in the bottom half of the slide, and when said slide $c$ is pushed downward, the shoulder $f$ on said slide acting on the edge of the plate-receiver forces the same downward from the compartment $a'$ to the compartment $a^2$. The plate is then exposed in the usual manner. When the slide $c$ is withdrawn, said plate is held by the springs $r$ while the slide is moved upward, and when said slide is moved up sufficiently, said springs $r$ force the plate to the rear part $a^3$ of the lower-compartment $a^2$, in which part $a^3$ the exposed plates accumulate. When a number of plates have been exposed, the screw $g$ having a head $Z'$ is withdrawn, and the camera turned upside down so as to permit the exposed plates to slide from the part $a^3$ of the lower compartment $a^2$ into the part $a^4$ of the upper compartment $a'$, which part $a^4$ is bounded by the rear wall of the upper compartment $a'$ and the rear side of the upper part of the slide $c$. The screw $g$ is then replaced and serves to hold the exposed plates in the part $a^4$ of the upper compartment $a'$, leaving a space in the rear part of the lower compartment for fresh exposed plates. Said screw $g$ is arranged in line with the partition $p$. The extension $d$ is provided on its bottom with an arm $t$ having a shoulder $t'$, that can abut against the adjusted pivoted stop $v$, the point of which passes over a quadrant-shaped, graduated scale $v'$. The arm $t$ which can be withdrawn more or less, according to the adjustment of the stop $v$ can be locked in a desired position by means of a screw $u$ passing through a slot of said arm $t$. The camera is always ready for use, without requiring previous adjustment, all that is necessary being to raise the slide $c$ and push it down again. The back N of the camera can be removed, as it is provided with tongues that slide in grooves of the said walls, as shown in Fig. 4 and can be locked in place by a catch $g$.

Having thus described my invention, I claim as new and desire to secure by Letters Patent—

1. The combination, with a photographic camera-casing, of a partition dividing the same into an upper and a lower compartment, which partition extends to within a short distance of the rear wall of the camera, a slide passed through said upper and lower compartments at the rear of said partition and a screw projecting from the back of the camera to the slide in the same plane as the said partition, substantially as set forth.

2. The combination, with a camera-casing, of an extension piece carrying the lens, an arm projecting from said extension piece and having a shoulder, an adjustable stop against which said shoulder can rest, and a screw for holding said arm in place on the casing, substantially as set forth.

In testimony that I claim the foregoing as my invention I have signed my name in presence of two subscribing witnesses.

BERTEL GEORG PAGH MÖLLER.

Witnesses:
N. SCHIENERY,
T. NIELSEN.